United States Patent [19]
Ryan

[11] 3,749,249
[45] July 31, 1973

[54] METHOD AND APPARATUS
[75] Inventor: Leo F. Ryan, Westwood, N.J.
[73] Assignee: Ecodyne Corporation, Chicago, Ill.
[22] Filed: Mar. 5, 1971
[21] Appl. No.: 121,533

Related U.S. Application Data
[62] Division of Ser. No. 673,111, Oct. 5, 1967.

[52] U.S. Cl. .............................. 210/268, 210/279
[51] Int. Cl. ........................................... B01d 15/04
[58] Field of Search ................. 23/270 R; 210/33, 210/189, 257, 258, 268, 278, 279

[56] References Cited
UNITED STATES PATENTS

| | | |
|---|---|---|
| 3,298,791 | 1/1967 | Meyer et al. ...................... 23/270 R |
| 3,311,552 | 3/1967 | Staats ................................... 210/33 |
| 3,607,740 | 9/1971 | Akeroyd .............................. 210/33 |
| 3,262,396 | 7/1966 | Kingsbury ........................ 210/33 X |
| 3,244,561 | 4/1966 | Mihara et al. .................... 210/33 X |
| 3,317,044 | 5/1967 | Marks ............................. 210/279 X |
| 2,902,445 | 9/1959 | Mathews .......................... 210/33 X |

Primary Examiner—Charles N. Hart
Attorney—James P. Hume et al.

[57] ABSTRACT

Exhausted ion exchange resin particles of the hydrogen-form, cationic type are regenerated in a countercurrent process with sulfuric acid, while preventing the formation of calcium sulfate precipitate. Exhausted resin is introduced into the column at the top, and material is simultaneously withdrawn from a lower portion. The volume in the column is maintained constant by introducing a non-precipitating liquid such as water. Preferably, the non-precipitating liquid is introduced through the same filter that is used for withdrawing exhausted regenerant, thereby washing and purging it. The invention also includes apparatus having resin inlet means at the top, outlet means at the bottom, means for circulating regenerant, and means for introducing a second liquid near the top. Preferably, the second liquid inlet means and regenerant outlet means communicate with the apparatus through a common filter.

1 Claim, 1 Drawing Figure

PATENTED JUL 31 1973　　　　　　　　　　　　　3,749,249
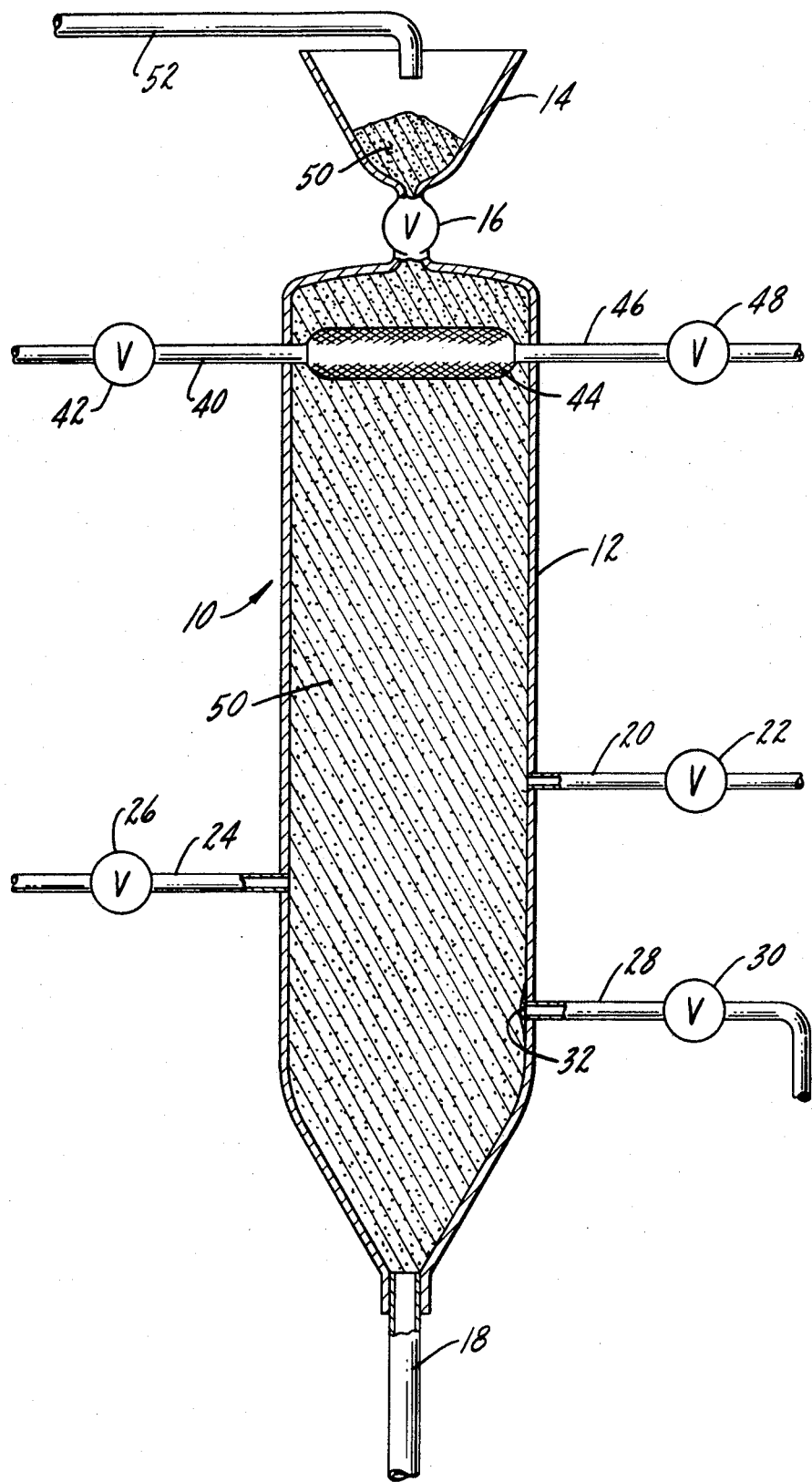

METHOD AND APPARATUS

This application is a division of copending application Ser. No. 673,111, filed Oct. 5, 1967.

The present invention relates to improvements in the art of regenerating ion exchange resin particles, and more specifically to an improved method and apparatus for regenerating exhausted ion exchange resin particles while preventing contamination resulting from the formation of undesirable precipitates.

Continuous countercurrent ion exchange processes are often carried out in an apparatus including three vessels: a service column, a regeneration column, and a wash column. The service column treats influent water with fresh ion exchange resin particles. Exhausted resin particles are periodically removed from the bottom of the service column and fresh resin particles are introduced from the top. The exhausted resin particles are transferred to a regeneration column where they are treated with a suitable regenerant solution, depending upon the type of resin being employed. The regenerated resin particles are then transferred to a wash column where they are washed before being again transferred into the service column for re-use. In some cases sufficient washing takes place in the regeneration column, so that a separate washing column is not needed. When a mixed bed (anionic plus cationic resin particles) system is employed, a separation apparatus is included in the system between the service column and the regeneration column. The anionic and cationic resins are then regenerated in separate columns.

Exhausted resin particles from the service column are transferred to a reservoir at the top of the regeneration column preparatory to introduction into the column itself. During operation, the column is pressurized and regeneration is accomplished by introducing regenerant into a lower portion of the column and removing it near the top after it percolates through the resin particles. The regenerated resin particles periodically are withdrawn from the bottom of the column during the regeneration cycle.

In charging the column with exhausted resin particles from the reservoir, a piston-type action is employed whereby the non-turbulent, downward flow of liquid within the column allows exhausted resin particles to flow down into the column. Prior to the present invention, such downward flow was created by depressurizing the column and withdrawing liquid from a lower portion while allowing the introduction of exhausted regenerant near the top. The exhausted regenerant was introduced from a surge tank which retained a sufficient volume before disposing of it in the waste drain. While such a procedure is satisfactory for most combinations of resin and regenerant, severe difficulties are encountered where a relatively insoluble material is formed during the regeneration process. Commonly, such a material is formed where sulfuric acid is employed to regenerate hydrogen-form strong acid cation exchange resin particles. The exhausted resin retains calcium ions, removed from the raw water in the service column, which are exchanged for hydrogen ions in the sulfuric acid, forming a supersaturated solution of calcium sulfate. Holding the exhausted regenerant in a surge tank, and agitating it by re-introducing it into the column, encourages precipitation of the calcium sulfate. The introduction of seed crystals into the column causes further precipitation, agglomerating with the resin particles and eventually plugging the column. The precipitate may also plug the filter used at the regenerant outlet, interfering with the movement of regenerant.

Because of the problem of calcium sulfate precipitation, it has been considered difficult to employ sulfuric acid in the countercurrent regenerantion of hydrogen-form cationic ion exchange resins. Instead, hydrochloric acid has been used. Although the use of hydrochloric acid avoids the precipitation of insoluble materials, it is much more expensive, and therefore less desirable than sulfuric acid.

The invention, both as to its organization and method of operation, will be understood by reference to the following description taken in conjunction with the accompanying drawing, which is a partially schematic illustration of regeneration apparatus embodying the features of the present invention.

Generally, the method of the present invention includes the introduction of particulate ion exchange resin particles into the top of a column of material including liquid while simultaneously draining liquid at a drain point in a lower portion of the column. Simultaneously with the above steps, a second liquid is introduced into the column at a point near the top and above the drain point in an amount sufficient to maintain the column at constant volume in order that the resin particles will be drawn by gravity into the column with a non-turbulent, downward, piston-type flow of the material within the column. In order to achieve the advantages of the present invention, it is essential that the second liquid be "non-precipitating." That is, it must be free of insoluble materials that could cause precipitation within the column, as well as materials that would react within the column to form a precipitate. Normally the second liquid will be water or water containing an additive to inhibit precipitation.

The present invention also includes apparatus for carrying out the method, generally including a regeneration vessel for supporting a column of liquid together with means for feeding exhausted ion exchange resin particles from the service column to an upper portion of the regeneration vessel, a drain means, communicating with the vessel at a drain point, for withdrawing liquid, and resin removal means at the bottom of the vessel for withdrawing resin. Above the drain point and near the top of the vessel, liquid inlet means communicate with the vessel for introducing a second, non-precipitating liquid into the vessel to create a downward, piston-type flow, allowing the particulate resin to fall smoothly into the column. The vessel also includes regenerant inlet means for introducing fresh regenerant and regenerant outlet means above the regenerant inlet means for passing regenerant through the regeneration vessel in an upward direction.

More specifically, the present invention contemplates an improved method for handling ion exchange resin particles during the regeneration process where there is a possibility of bringing about the precipitation of relatively insoluble materials, such as calcium sulfate, formed during regeneration. The countercurrent regeneration of ion exchange resin particles generally involves two steps — a regeneration step and a charging step. During the regeneration step, exhausted resin is regenerated in a pressurized column, wherein regenerant is fed into the column near the bottom and withdrawn near the top when exhausted. Regenerated resin is periodically removed at the bottom of the column during the regeneration step.

During the charging step, pressure within the column is released, and liquid is drained from the column at a drain point, preferably located below the lowest liquid input point, and usually in a lower portion of the column. Simultaneous with the draining of liquid at the drain point, a non-precipitating liquid such as water, or water with a chelating agent or other precipitation inhibitor, is introduced into the column at a point near the top and above the drain point. Preferably, the water is relatively free of ions that could contaminate the resin particles or contribute to the formation of precipitates. A convenient source of purified water is the effluent line of the service column, which supplies water that has been treated with regenerated resin. Suitable precipitation inhibitors include cationic, anionic, and nonionic surfactants, as well as polyphosphates and non-precipitate-forming acids such as hydrochloric acid. The introduction of the non-precipitating liquid above the drain point insures that a downward piston-type action will be developed within the column, aiding in the introduction of resin particles into the column through a suitable valve at the bottom of the resin reservoir. After the desired amount of exhausted resin has been taken into the column, the removal of liquid at the drain point and the input of the non-precipitating liquid are stopped. The column is repressurized and the regeneration of the resin particles is resumed.

During the regeneration step, the withdrawal of circulated regenerant is generally handled through filter means to prevent resin particles from being drawn out of the column. In the preferred embodiment of the present invention, during the introduction of resin into the column, the non-precipitating liquid is fed in through the same filter means as is used in the withdrawal of circulating regenerant. The use of a common filter means insures that the non-precipitating liquid will backwash any particulate material clinging to its exterior, and will dilute and purge the exhausted regenerant that is retained in the filter when regeneration is halted. This dilution helps to prevent the precipitation of materials within the filter, thereby avoiding clogging of the filter or introduction of precipitated material into the column itself. Also, use of the filter helps to prevent undesirable turbulence which may be caused by the introduction of liquid into the column. The particular type and shape of the filter is not critical, so long as it prevents resin particles from being drawn out of the column during regeneration.

The method of the present invention may be employed to regenerate any of the well-known particulate, hydrogen-form, cationic ion exchange resins. Included are resins of the divinylbenzene-styrene copolymer type, the acrylic type, the sulfonated coal type, and the phenolic type.

The drawing illustrates regeneration apparatus, indicated generally by reference numeral 10, embodying the features of the present invention. The regeneration apparatus 10 includes a columnar tank 12 having a hopper 14 located at the top. The hopper 14 communicates with the tank through a one-way check valve 16 maintained in a closed position during regeneration by the pressure of liquids within the tank 12. Communicating with the bottom of the tank 12 is a resin outlet pipe 18, leading to the next portion of the ion exchange apparatus (not shown), such as a wash column or service column. Communicating with a lower portion of the tank 12 is a regenerant inlet pipe 20 having a valve 22. Below the regenerant inlet pipe 20, a water inlet pipe 24, controlled by a valve 26, communicates with the tank 12. A drain pipe 28 having a valve 30 communicates with the tank 12 below the regenerant and water inlet pipes 20, 24. The drain pipe 28 communicates with the tank through a screen 32 which prevents the passage of particles.

A regenerant outlet pipe 40 having a valve 42 extends into the tank 12 at a point near the top and just below the one-way check valve 16. A cylindrical filter 44 is connected to the regenerant outlet pipe 40 at a point just within the wall of the tank 12. The filter 44 crosses the tank 12 in a transverse direction to the point near the opposite wall. A liquid inlet pipe 46 having a valve 48 enters the tank 12 and connects with the filter 44 at the end opposite the regenerant outlet pipe 40. It is thus seen that the regenerant outlet pipe 40 and the liquid inlet pipe 46 are connected to opposite ends of a common cylindrical filter 44. While this represents the preferred arrangement, it will be understood that the liquid inlet pipe 46 may simply be connected to the tank 12 at any point near the top without necessarily going through the filter 44. However, the filter could not be cleaned or purged of exhausted regenerant with such an arrangement, presenting a substantial danger of contaminating the regenerated resin particles or clogging the filter 44. Preferably, the other end of the liquid inlet pipe 46 communicates with the effluent line of the service column (not shown) so that purified water may be supplied to the tank 12 through the liquid inlet pipe 44.

At the start of the regeneration cycle, the tank 12 is normally filled with closely packed resin particles 50 along with some liquid. Additional exhausted resin particles 50 are periodically delivered to the hopper 14 by the resin feed pipe 52.

In operation, during the regeneration of the resin particles, the valves 30, 48 on the drain pipe 28 and the liquid inlet pipe 46, respectively, are closed, while the valves 22, 26, 42 on the regenerant inlet pipe 20, the water inlet pipe 24, and the regenerant outlet pipe 40, respectively, are open. The valves are adjusted to maintain the material in the tank 12 under positive pressure. Pressurized water is fed into the vessel through the water inlet pipe 26 and a regenerant is simultaneously fed in through the regenerant inlet pipe 30. The regenerant and water travel upwardly through the tank 12 percolating through the resin particles 50. When it reaches the top of the tank 12, the regenerant will be nearly exhausted. Where sulfuric acid is used to regenerate cationic resins, it will usually be saturated or supersaturated with calcium sulfate. The exhausted regenerant enters the cylindrical filter 44, which will not admit resin particles, and exits to a drain (not shown) through the regenerant outlet pipe 40. During the process the one-way check valve 16 is maintained in a closed position by the pressure of the liquid within the tank 12. The introduction of additional exhausted resin particles 50 into the tank 12 is thereby prevented.

At the start of the regeneration step, the tank 12 will be nearly full of exhausted resin particles 50, as shown in the drawing. Water entering the tank 12 through the water inlet pipe 24 washes resin below the level of the regenerant inlet pipe 20, since both the water and regenerant move in an upward direction. Periodically, portions of the regenerated resin particles are withdrawn from the bottom of the tank 12 through the resin outlet pipe 18. The withdrawal of resin particles 50 is caused by periodic pressure drops in the resin outlet pipe 18, causing resin 50 to be forced out by the pressure within the tank 12. The pressure drops are caused by pressure changes in the next phase of an overall ion exchange system, and result from the system automatically passing through its operating cycles.

Periodically, the regeneration is halted by closing the valves 22, 26, 42 on the regenerant inlet pipe 20, the water inlet pipe 24, and the regenerant outlet pipe 40, respectively. The tank 12 is depressurized by opening the valve 30 in the drain pipe 28. The release of pressure within the tank 12 causes the one-way check valve 16 to open, and exhausted ion exchange resin particles 50 flow into the tank 12. Approximately simultaneous with the opening of the valve 30 in the drain pipe 28, the valve 48 in the liquid inlet pipe 46 is opened, allowing a non-precipitating liquid such as water treated in the service column (not shown) to enter the tank 12 through the filter 44. The water washes away any particulate material that has collected on the exterior of the filter 44, and dilutes any exhausted regenerant retained in the filter 44, thereby preventing clogging. The simultaneous introduction of liquid through the liquid inlet pipe 46 and withdrawal of liquid through the drain pipe 28 creates a smooth, downward, piston-type flow within the tank 12, permitting exhausted resin particles 50 to fall smoothly into the tank 12. It is of course essential during this step to regulate the flow of liquid coming in through the liquid inlet pipe 46 in order that the overall pressure within the tank 12 will not prevent the one-way check valve 16 from opening. On the other hand, sufficient flow must be maintained in order to keep the tank 12 completely filled.

After sufficient resin particles 50 have been taken into the tank 12, the valves 30, 48 on the drain pipe 28 and the liquid inlet pipe 46 are closed, and the regeneration of resin particles as hereinafter described is resumed.

The above-described sequence of steps will generally be performed automatically through conventional control means operating suitable remote control valves as will be understood by one with ordinary skill in the art. The regeneration apparatus may thus perform as part of an overall system for automatically treating liquids with ion exchange resin while simultaneously regenerating resin.

The following examples are intended to illustrate the present invention, and should not be construed as limitative, the scope of the invention being determined by the appended claims.

EXAMPLE 1

Regeneration apparatus of the type shown in the drawing was used to continuously regenerate hydrogen-form cationic exchange resin of the divinylbenzene-styrene copolymer type. The exhausted resin contained approximately 1.8 gram equivalents of calcium and 0.2 gram equivalents of sodium per liter, previously removed from water in a service column. Water was fed into the column at a point near the bottom, and sulfuric acid solution was metered into the column at a point above the water input point so that the acid concentration within the column above the acid introduction point was about 0.25 normal. The acid solution removed approximately 0.4 gram equivalents of calcium and 0.2 gram equivalent of sodium per liter of resin as it percolated upwardly through the resin particles. The partially exhausted regenerant together with the calcium and sodium ions removed from the resin flowed from a point near the column top through a filter to a drain.

Once during each 2½ minutes of operation, the column was charged with additional exhausted resin. In the charging step, the input of water and acid was halted, and the column was depressurized by withdrawing liquid through a pipe communicating with the column in a lower portion. The release of pressure within the column allowed exhausted resin particles to flow in from a reservoir at the top. Simultaneous with the withdrawal of liquid and input of exhausted resin particles, treated water from the service column was allowed to flow into the regeneration column through the filter. The flow was sufficient to maintain the column filled with liquid.

Even though sulfuric acid was used with the regenerant, there was no evidence of the formation of calcium sulfate precipitation, after 100 hours of operation, involving about 2,400 charging steps.

EXAMPLE 2

Apparatus similar to that employed in Example 1 was fitted with a surge tank constructed to retain a volume of exhausted regenerant before discharge to a drain. Example 1 was repeated, except that water was not introduced into the column during the charging step. Instead, exhausted regenerant containing calcium sulfate was allowed to flow back into the column from the surge chamber at a rate sufficient to maintain the column filled with liquid. The accumulation of calcium sulfate precipitate in the chamber, on the filter, and within the column, prevented continuous operation of the apparatus for more than about 8 hours. Repeated dismantling of the apparatus was required to remove the precipitate.

While the embodiment described herein is at present considered to be preferred, it will be understood that various modifications and improvements may be made therein and it is intended to cover in the appended claims all such modifications and improvements as fall within the true spirit and scope of the invention.

I claim:

1. In an apparatus for regenerating exhausted ion exchange resin particles including a regeneration vessel for supporting a column of liquid and resin particles, regenerant inlet means for introducing fresh regenerant liquid into said regeneration vessel, regenerant outlet means communicating with said regeneration vessel above said regenerant inlet means, feed means communicating with an upper portion of said regeneration vessel for delivering exhausted ion exchange resin particles into said regeneration vessel, drain means communicating with said regeneration vessel below said regenerant inlet means, and resin removal means communicating with the bottom of said regeneration vessel, the improvement comprising: liquid inlet means communicating with an upper portion of said regeneration vessel for introducing a non-precipitating liquid, said liquid inlet means and said regenerant outlet means communicating with said regeneration vessel through a common filter means within said vessel.

* * * * *